(12) United States Patent
Kuchiki (10) Patent No.: US 9,865,064 B2
(45) Date of Patent: Jan. 9, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 15/067,008

(22) Filed: Mar. 10, 2016

(65) Prior Publication Data
US 2016/0269636 A1 Sep. 15, 2016

(30) Foreign Application Priority Data

Mar. 12, 2015 (JP) .................................. 2015-049970

(51) Int. Cl.
*G06T 7/40* (2017.01)
*H04N 5/232* (2006.01)
*G06T 7/215* (2017.01)

(52) U.S. Cl.
CPC .............. *G06T 7/408* (2013.01); *G06T 7/215* (2017.01); *H04N 5/232* (2013.01); *H04N 5/23254* (2013.01); *H04N 5/23261* (2013.01); *H04N 5/23287* (2013.01); *G06T 2200/32* (2013.01); *G06T 2207/10016* (2013.01); *G06T 2207/30236* (2013.01)

(58) Field of Classification Search
CPC ..... G06T 7/408; G06T 7/215; H04N 5/23254; H04N 5/23261; H04N 5/23287
USPC ................................ 348/208.1, 208.3, 208.4
See application file for complete search history.

(56) References Cited

U.S. PATENT DOCUMENTS

| | | | | |
|---|---|---|---|---|
| 5,291,300 | A * | 3/1994 | Ueda ................... | H04N 5/23264 348/208.99 |
| 9,723,209 | B2 * | 8/2017 | Takayanagi ........ | H04N 5/23287 |
| 2009/0219415 | A1* | 9/2009 | Matsunaga ........ | H04N 5/23232 348/239 |
| 2012/0206597 | A1* | 8/2012 | Komoto ................. | G06T 7/215 348/135 |
| 2015/0002684 | A1* | 1/2015 | Kuchiki ............. | H04N 5/23261 348/208.4 |

(Continued)

FOREIGN PATENT DOCUMENTS

| | | |
|---|---|---|
| JP | 2003-279848 A | 10/2003 |
| JP | 2006-317848 A | 11/2006 |

*Primary Examiner* — Nhan T Tran
(74) *Attorney, Agent, or Firm* — Cowan, Liebowitz & Latman, P.C.

(57) ABSTRACT

An image processing apparatus includes: a division unit configured to divide each of a plurality of frame images into a plurality of regions on a screen; a motion vector detection unit configured to detect a motion vector for each of the divided regions; a separation unit configured to separate a subject vector that indicates motion of a subject from a background vector that indicates motion of a background, based on a panning speed of the apparatus that was detected by a panning detection unit and the motion vector detected by the motion vector detection unit; and an identification unit configured to identify a subject region by weighting the subject vector based on information regarding a distance of the subject that was detected by a distance detection unit for each of the divided regions of the plurality of frame images.

12 Claims, 11 Drawing Sheets

(56) References Cited

U.S. PATENT DOCUMENTS

2015/0003676 A1* 1/2015 Kuchiki ............... G06T 7/2053
                                                    382/103

* cited by examiner

IMAGE PROCESSING APPARATUS, IMAGE PROCESSING METHOD, AND STORAGE MEDIUM

BACKGROUND OF THE INVENTION

Field of the Invention

The present invention relates to a technique for assisting in capturing a panning shot.

Description of the Related Art

A panning shot technique is known as a shooting technique that expresses a sense of speed for a moving subject. This shooting technique is to capture a moving subject so that it appears to be still while the background appears to be moving, due to a user panning a camera so as to follow the motion of the subject. Ordinary panning shots are captured by adjusting an exposure time to be longer than an ordinary exposure time, according to the moving speed of a subject to be captured.

In capturing a panning shot, a user needs to perform panning so as to follow the motion of the subject, and if the panning speed is too high or low thus creating a difference between the panning speed and the moving speed of the subject, it will often be the case where the image of the subject is also blurred. In order to solve such a problem, a technique for eliminating a difference between the moving speed of the subject and the panning speed by moving a shift lens for correcting hand shake has been proposed as a technique for assisting a user in capturing a panning shot. For example, Japanese Patent Laid-Open No. 2006-317848 discloses a configuration that captures a panning shot in which shaking of an apparatus is detected by a gyro-sensor, a subject is detected based on motion vectors of an image, a correction amount for positioning the detected subject at the center of the image is calculated, and the correction is performed by moving an optical axis shift lens. Japanese Patent Laid-Open No. 2003-279848 discloses a configuration in which an image is divided into a plurality of regions, and a main subject is detected based on the subject brightness and the subject distance, capturing magnification, and subject movement distribution that are detected for each region.

However, in the technique disclosed in the above-described Japanese Patent Laid-Open No. 2006-317848, shaking of the apparatus is detected by the gyro-sensor, and a subject is detected based on motion vectors of an image. Therefore, in a case, for example, where a subject is approaching a user or there are a plurality of subjects, there is the problem that a plurality of motion vectors that have similar magnitudes and orientations may be detected, and it is difficult to suppress blurring of a subject at a position that is desired by the user to appear to be still.

Also in the technique disclosed in Japanese Patent Laid-Open No. 2003-279848, if a user tries to capture a panning shot in a case where there are a plurality of moving subjects, it will be difficult to appropriately detect the subject that is desired by the user to appear to be still when the panning speed of the camera differs from the moving speed of the subject, because the technique does not take into consideration the influence of panning of a camera.

SUMMARY OF THE INVENTION

The present invention was made in view of the above-described problems, and enables, when a panning shot is to be captured, more accurate capturing of a subject that is desired by a user to appear to be still without being blurred.

According to a first aspect of the present invention, there is provided an image processing apparatus comprising: a division unit configured to divide each of a plurality of frame images that were continuously captured by an image capturing unit into a plurality of regions on a screen; a motion vector detection unit configured to detect a motion vector for each of the divided regions of the plurality of frame images; a separation unit configured to separate a subject vector that indicates motion of a subject from a background vector that indicates motion of a background, based on a panning speed of the apparatus that was detected by a panning detection unit and the motion vector detected by the motion vector detection unit; and an identification unit configured to identify a subject region by weighting the subject vector based on information regarding a distance of the subject that was detected by a distance detection unit for each of the divided regions of the plurality of frame images.

According to a second aspect of the present invention, there is provided an image processing method comprising: dividing each of a plurality of frame images that were continuously captured by an image capturing unit into a plurality of regions on a screen; detecting a motion vector for each of the divided regions of the plurality of frame images; separating a subject vector that indicates motion of a subject from a background vector that indicates motion of a background, based on a panning speed of an apparatus that was detected by a panning detection unit and the motion vector detected in the motion vector detection; and identifying a subject region by weighting the subject vector based on information regarding a distance of the subject that was detected by a distance detection unit for each of the divided regions of the plurality of frame images.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings.

First Embodiment

Figure 1:
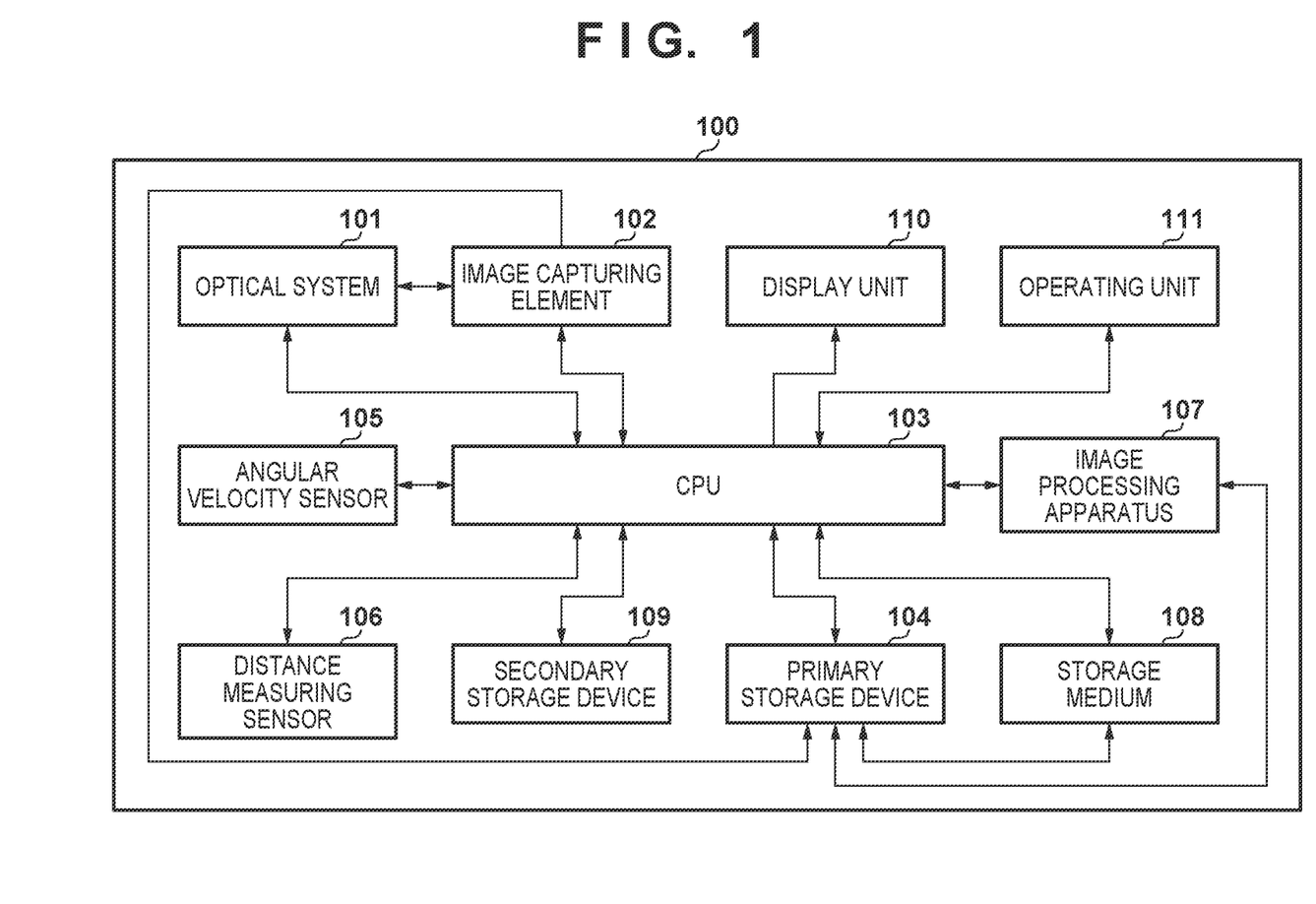
FIG. 1 is a block diagram illustrating a basic configuration of an image capturing device according to a first embodiment of the present invention.

FIG. 1 is a block diagram illustrating a basic configuration of an image capturing device 100, which is an image processing apparatus according to a first embodiment of the present invention. The image capturing device 100 may not only be a camera, such as a digital camera or digital video camera, but also be a suitable electronic device having a camera function, such as a mobile phone with a camera function or a computer with a camera.

In FIG. 1, an optical system 101 is constituted by a lens, shutter, and a diaphragm, and forms an image using light from a subject on an image capturing element 102 under control by a CPU 103. The Image capturing element 102, which includes a CCD image sensor, a CMOS image sensor, or the like, converts the light of the image formed through the optical system 101 into an image signal. An angular velocity sensor 105 such as a gyro-sensor detects the panning angular velocity indicating the moving amount of the image capturing device 100, converts the detected panning angular velocity into an electric signal, and transmits the converted electric signal to the CPU 103. A distance measuring sensor 106 detects a subject distance and a defocus amount (hereinafter, referred to as "distance map") of the subject captured by the image capturing element. 102 (distance detection), converts the detected subject distance or defocus amount into an electric signal, and transmits the converted electric signal to the CPU 103. Instead of the distance measuring sensor 106, the image capturing element 102 may detect a phase difference or a contrast to obtain a focal position, and obtain the subject distance based on the focal position.

The CPU 103 realizes the functions of the image capturing device 100 by controlling the components constituting the image capturing device 100 in accordance with input signals and programs stored in advance. A primary storage device 104 is, for example, a volatile memory such as a RAM that temporarily stores data, and is used as a work area for the CPU 103. Furthermore, information stored in the primary storage device 104 is used in an image processing apparatus 107, is stored in a storage medium 108, or the like. A secondary storage device 109 is, for example, a non-volatile memory such as an EEPROM that stores programs (firmware), various types of setting information, and the like for use in controlling the image capturing device 100, and is used by the CPU 103.

The storage medium 108 records data of a captured image that is stored in the primary storage device 104, and the like. Note that the storage medium 108 is, for example, a semiconductor memory card or the like, and is configured to be removable from the image capturing device 100, and the data stored therein can be read out by the storage medium 108 being attached to a personal computer or the like. That is, the image capturing device 100 has an attachment/removal mechanism and reading/writing functions for the storage medium 108. A display unit 110 displays a view finder image during image capture, a captured image, a GUI image for interactive operation, and the like.

An operating unit 111 is a group of input devices that accepts user operations and transmits the input information to the CPU 103, and may naturally include, for example, buttons, levers, a touch panel, and the like but may also include input devices that uses sound, lines of vision, and the like. Note that the image capturing device 100 of the present embodiment has a plurality of image processing patterns that are to be applied to a captured image by the image processing apparatus 107, and a pattern can be set as an image capturing mode from the operating unit 111. The image processing apparatus 107 performs, in addition to image processing referring to as so-called development processing, color tone adjustment, and the like. Note that at least some functions of the image processing apparatus 107 may be realized with software by the CPU 103.

Note that in FIG. 1, the image capturing device 100 is a device in which the optical system 101 is formed integrally as one piece with the main body of the image capturing device, but may be configured as a lens exchangeable capturing system in which parts of the optical system are removable from the main body of the image capturing device.

Figure 2:
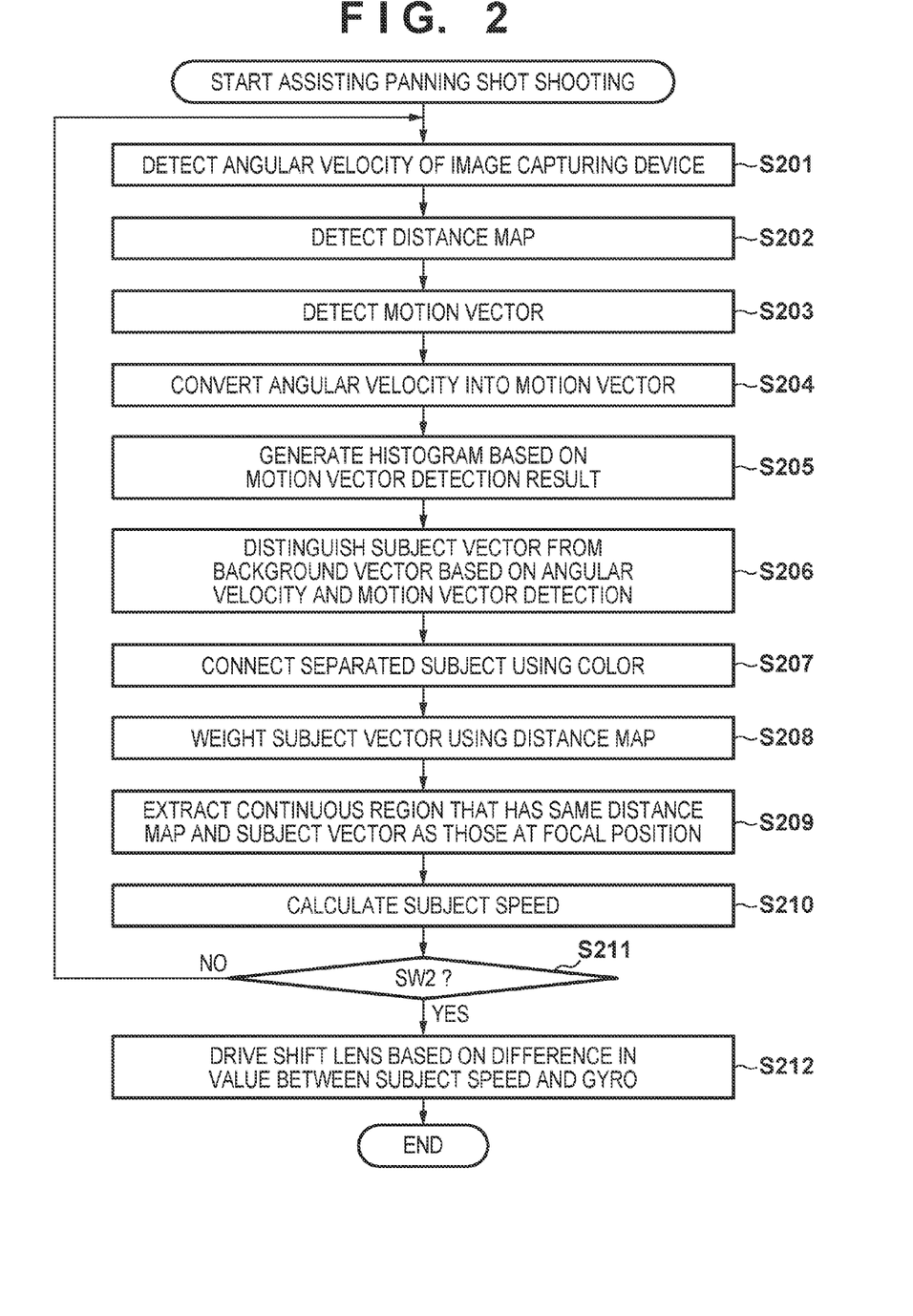
FIG. 2 is a flowchart illustrating processing for assisting in capturing a panning shot according to the first embodiment.

FIG. 2 is a flowchart illustrating the flow of operation for assisting in capturing a panning shot according to the present embodiment. Note that this flow can be started by, for example, a shutter button of the operating unit 111 being pressed halfway down, or the like. Furthermore, this operation for assisting in capturing a panning shot is performed in the state in which a plurality of frame images are continuously acquired by live view, a photometric sensor, or the like.

First, in step S201, the CPU 103 detects the panning angular velocity of the image capturing device 100 that was detected by the angular velocity sensor 105 (panning detection). Then, in step S202, the CPU 103 divides each of the images continuously captured by the image capturing element 102 into a plurality of block regions on a screen, and detects, for each block region, the distance map that was detected by the distance measuring sensor 106. In step S203, similar to step S202, the CPU 103 detects, for each divided block region, a motion vector between the images using the image processing apparatus 107 (vector detection). Then, the detected motion vectors are converted into moving amounts v [mm] on an image capturing surface.

In step S204, the CPU 103 converts the panning angular velocity ω [rad/sec] of the image capturing device 100 that was obtained in step S201 into a moving amount L [mm] between the images on the image capturing surface using Formula (1):

$$L = f \cdot \tan(\omega/\text{fps}) \quad (1)$$

where f [mm] is the focal length and fps [frame/sec] is the image acquiring interval (hereinafter, referred to as "frame rate").

Figures 3A, 3C:
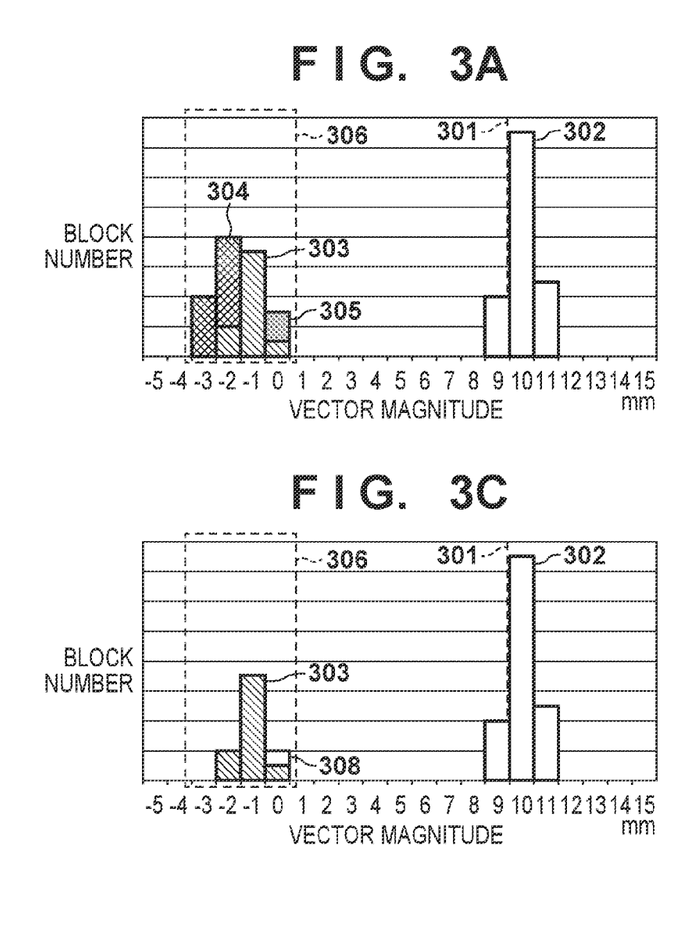
FIGS. 3A to 3D are diagrams illustrating changes in the histogram of motion vectors.

In step S205, the CPU 103 generates, based on the motion vectors detected in step S203, a histogram with a vertical axis representing the number of vector blocks and a horizontal axis representing the magnitudes of vectors as shown in, for example, FIG. 3A, using the image processing apparatus 107.

In step S206, the CPU 103 distinguishes (separates) vectors representing the motion of a subject (hereinafter, referred to as "subject vector") from vectors representing the motion of the background (hereinafter, referred to as "background vector"), based on the angular velocity ω [rad/sec] of the image capturing device 100 that was converted into the moving amount L [mm] in step S204 and the histogram of the motion vectors generated in step S205. The distinguishing a subject may be performed such that, for example, the motion vectors close to the angular velocity ω [rad/sec] of the image capturing device 100 that was converted into the moving amount L [mm] in step S204 are determined as the background vectors, and the next most detected motion vectors are determined as the subject vectors. Furthermore, if the angular velocity ω [rad/sec] of the image capturing device 100 is high a certain degree, it is conceivable that the background is also moving between frames a certain degree, and thus small motion vectors may also be determined as subject vectors. Note that in this context, the subject vector and the background vector are values converted into the moving amounts on the image capturing surface.

Figure 4A:
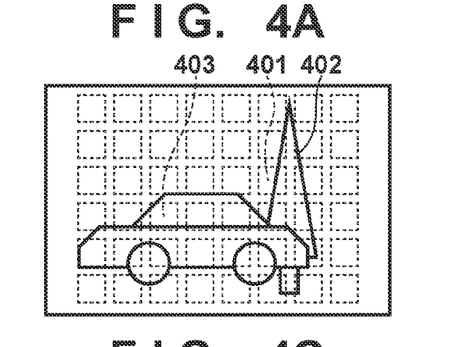
FIGS. 4A to 4E are diagrams illustrating a method for distinguishing a subject region from a background region.
Figure 4B:
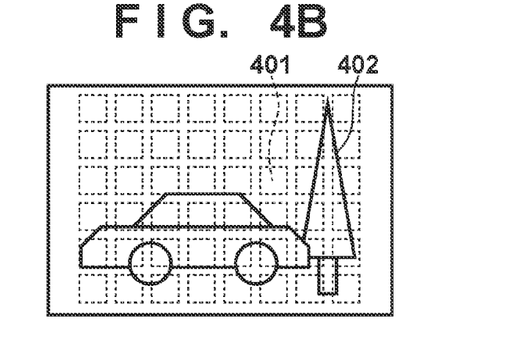
Figure 4C:
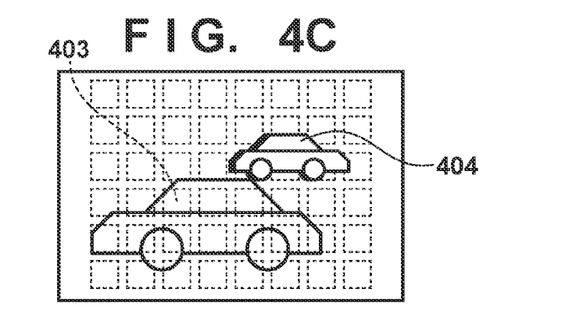

There is also a method for distinguishing a subject using the distance maps detected in step S202. FIGS. 4A and 4B show images acquired from continuous frames. Assuming that the reference numeral 403 indicates a subject that is moving in the right direction of the image, a background 402 will move between the frames when capturing a panning shot, and thus the subject distances detected for a block region. 401 are different between the frames. Furthermore, assuming that FIG. 4C shows an image acquired in an arbitrary frame, a subject 404 that is moving differently from the main subject is blurred, and thus it is not easy to obtain distance maps. Therefore, it is also possible to determine a block region for which the same distance map can be detected between frames as a subject region.

If a divided block region has a low contrast, there may be the case where no subject distance for this block region can be detected in step S202 or no motion vector for this block region can be detected in step S203, and thus it is desirable to define a subject region that is large a certain degree, and to calculate a final subject speed. Therefore, in step S207, the CPU 103 compares, using the image processing apparatus 107, color ratios (R/G and B/G) between the block region for which neither of the subject distance or the motion vector could be detected and an adjacent block region using Formula (2) (color ratio detection), and if a difference is between predetermined thresholds, it is determined that these block regions are of the same subject.

Threshold $Rm \leq \{(Ri/Gi)-(Ri-1/Gi-1)\} \leq$ threshold $Rp$

Threshold $Bm \leq \{(Bi/Gi)-(Bi-1/Gi-1)\} \leq$ threshold $Rp$ (2)

Figure 4D:
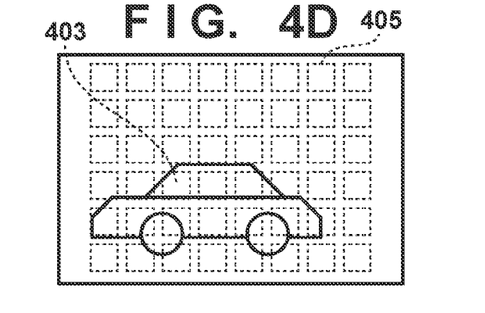
Figure 4E:
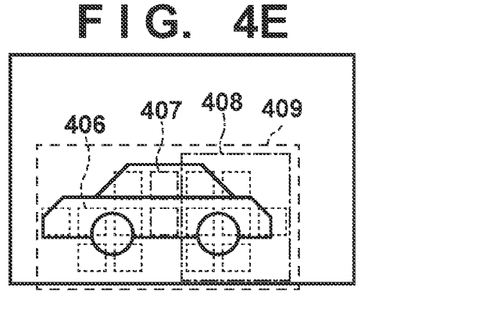

The following will describe the processing in step S207 of FIG. 2 with reference to FIGS. 4D and 4E. FIGS. 4D and 4E are diagrams illustrating examples of subject speed calculation regions in a given frame. The reference numeral 403 of FIG. 4D denotes the subject that is moving in the right direction of the image, and the reference numeral 405 denotes divided block regions. Furthermore, the reference numeral 406 of FIG. 416 denotes a block region for which a subject vector has been detected, and the reference numeral 407 denotes a region for which neither of a subject distance or a motion vector could be detected. Assuming that the final subject speed has been calculated for the largest continuous block region in which subject vectors were detected, the subject speed will be calculated for a region 408 behind the subject. However, by performing distinguishing a subject using colors, it is possible to calculate the subject speed in a region 409, which includes the entire subject. The subject is thus distinguished in the above-described manner.

The following will describe a method for weighting a subject vector using distance maps, the method being a characteristic feature of the present embodiment.

In step S208 of FIG. 2, the CPU 103 weights the motion vector determined as the subject vector in step S206 using the distance maps that were detected for the respective block regions in step S202.

Figures 3B, 3D:
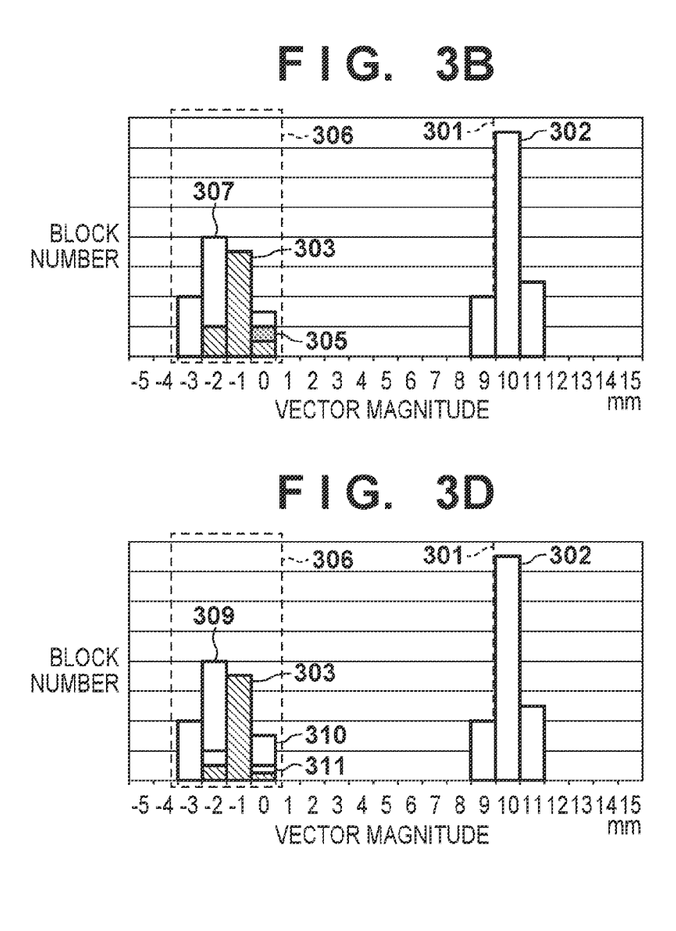
Figure 5A:
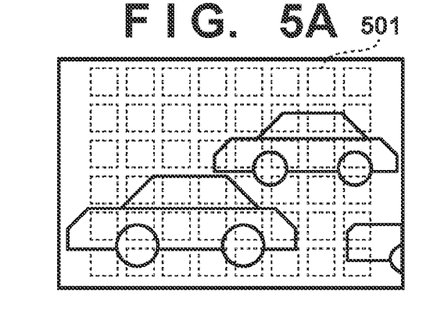
FIGS. 5A and 5B are diagrams illustrating subject vector regions.
Figure 5B:
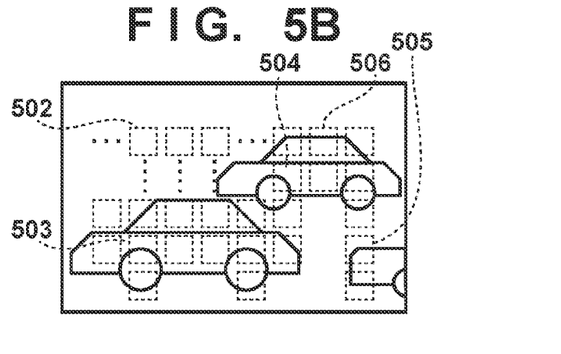

The processing of step S208 will be described with reference to FIGS. 3A to 3D, FIGS. 5A and 5B, and FIG. 6. FIGS. 3A to 3D are diagrams illustrating changes in the histogram of motion vectors in a given frame. Note that in the present embodiment, only FIGS. 3A to 3C are used for the description. Also, FIGS. 5A and 5B are diagrams illustrating subject vector regions in a given frame. Lastly, FIG. 6 is diagrams illustrating changes in the subject speed calculation regions in the frame shown in FIGS. 5A and 5B.

Figure 6:
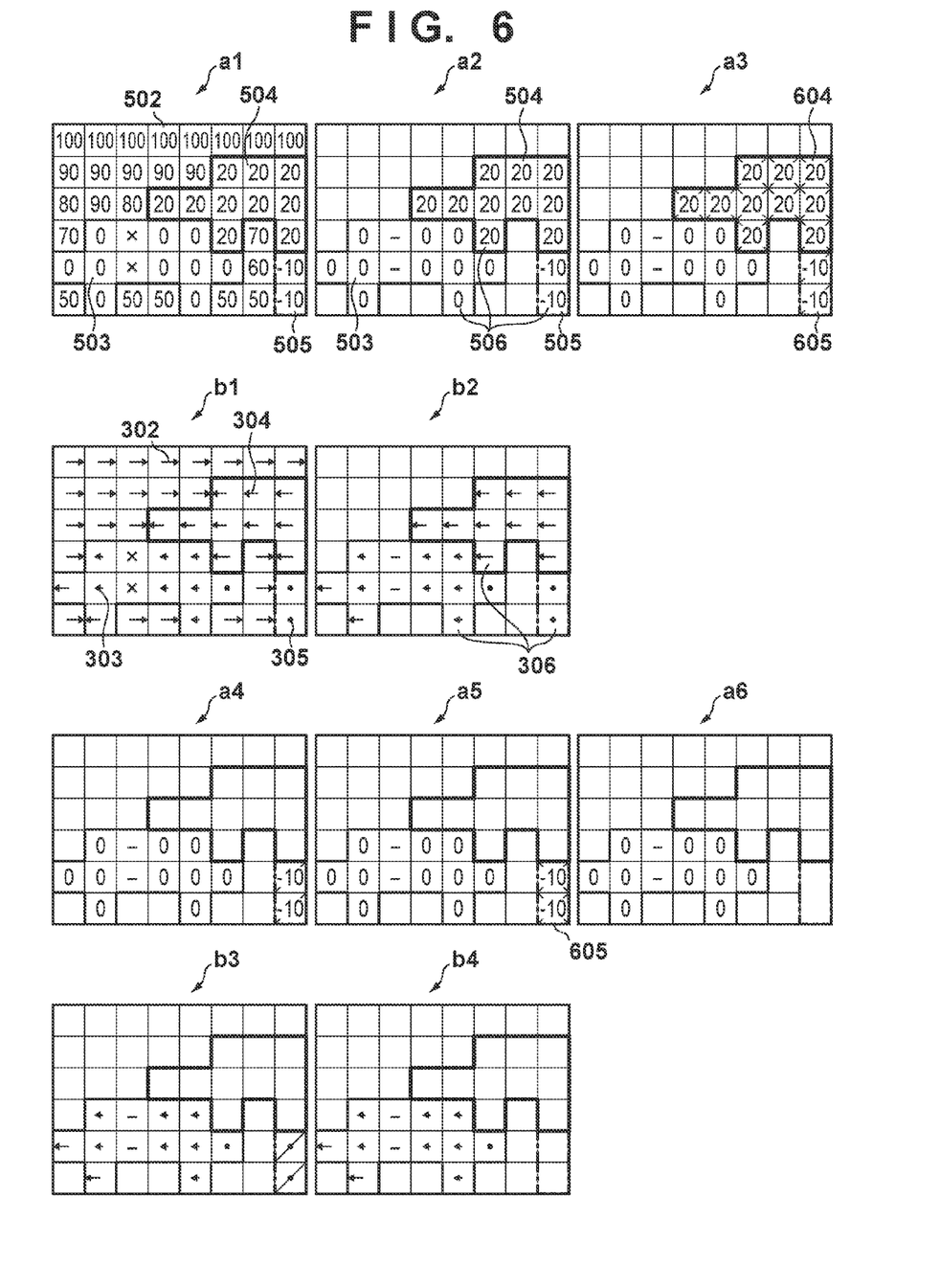
FIG. 6 is a diagram illustrating changes in distance maps and motion vectors according to the first embodiment.

In FIG. 6, a1 to a6 show the defocus amounts in the distance maps, and the defocus amount is 0 at the focal position, the defocus amount is negative when the subject is in front of the focal position, and the defocus amount is positive when the subject is behind the focal position. Furthermore, the magnitude of the shift amount from the focal position is expressed as a numeral character. In FIG. 6, b1 to b4 show motion vectors, and the direction of each motion vector is indicated, by a direction of an arrow, and the magnitude of the motion vector is indicated by the length of the arrow.

FIG. 6_a1 shows the distance maps detected for a divided block regions 501 as shown in FIG. 5A, and FIG. 6_b1 shows the motion vectors for the divided block regions. Furthermore FIG. 3A shows the motion vector distribution in a histogram with the vertical axis representing "the number of vector blocks", and the horizontal axis representing "the magnitude of vectors". The reference numeral 301 of FIG. 3A denotes the angular velocity ω [rad/sec] of the image capturing device 100 that was converted into the moving amount L [mm] on the image capturing surface in step S204.

In step S206 of FIG. 2, the CPU 103 determines a vector 302, which has approximately the same moving amount as that of the angular velocity 301 of the image capturing device 100, as the background vector, and vectors 306, which are different from the background vector and have a small amount of motion, as the subject vectors. FIG. 6_a2 shows the distance maps when the block regions determined as the subject vectors 306 are denoted by the reference numeral 506 of FIG. 5B (the region 506 is obtained by combining regions 503, 504, and 505), and FIG. 6_b2 shows the motion vectors thereof. Note that it is assumed that the motion vectors of a background 502 and the subjects 503 to 505 of FIGS. 5A and 5B are respectively denoted by the reference numerals 302, and 303 to 305 of FIGS. 3A to 3D.

Note that in FIGS. 3A to 3D, the motion vector 303 of the subject 503 is indicated by diagonal hatching, the motion vector 304 of the subject 504 is indicated by cross-hatching, and the motion vector 305 of the subject. 505 is indicated by dots. Here, when focusing on the subject 503 for example, even a car that corresponds to the subject 503 includes a partial detection error or the like in each of the car's motion vectors. Accordingly, as is clear from the parts of FIG. 6_b2 that correspond to the subject 503, the magnitudes of the motion vector are distributed over a range of −2 mm, −1 mm, and 0 mm, and in FIG. 3A, the diagonal hatching parts range over these three magnitudes. The same applies to the subject 504, and the magnitudes of the motion vector 304 that corresponds to the subject 504 are distributed over a range of −3 mm and −2 mm of FIG. 3A. On the other hand, the magnitude of the motion vector 305 that corresponds to the subject 505 is 0 as shown in FIG. 6a2, and thus is distributed at the position of 0 mm in FIG. 3A.

Figure 7:
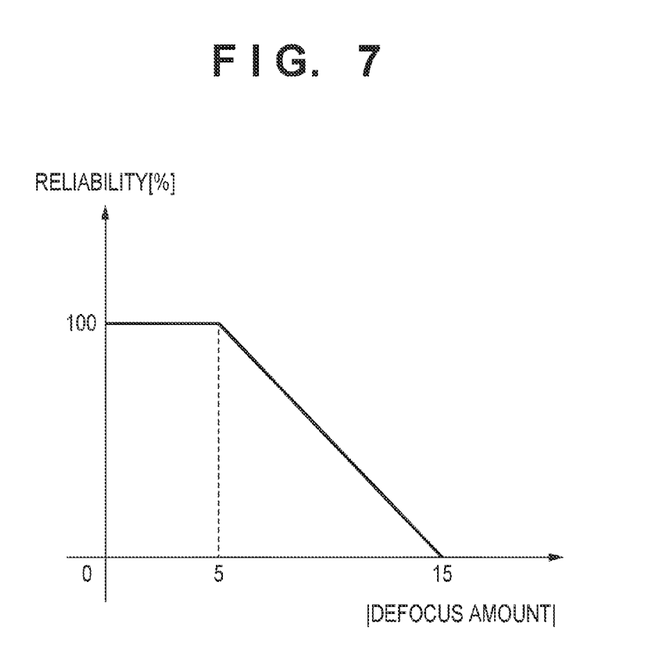
FIG. 7 is a diagram illustrating a reliability table of distance maps according to the first embodiment.

FIG. 7 is a reliability table for use in weighting a subject vector using the distance maps. According to the reliability table of FIG. 7, the block regions (the reference numeral 604 of FIG. 6_a3) that correspond to the subject 504 have a defocus amount that is 20, and thus have a reliability of 0%. Furthermore, the block regions (denoted by the reference numeral 605 of FIG. 6_a3) that correspond to the subject 505 have a defocus amount that is −10, and thus have a reliability of 50%. That is, a subject that is not in focus and blurred is determined not to be the subject part that is desired to appear to be still in panning shooting. Note that the thresholds of FIG. 7 are examples, and the present invention is not limited to these.

FIGS. 3B, 6_a4, and 6_b3 are diagrams illustrating the state after completion of the processing of step S208 of FIG. 2. Since the block regions 604 of FIG. 6_a3 that correspond to the subject 504 of FIGS. 5A and 5B have the reliability of 0%, the motion vector 304 of FIG. 3A is excluded from the subject vectors as shown by the reference numeral 307 of FIG. 3B. Since the block regions 605 of FIG. 6_a3, that is, the block regions that correspond to the subject 505 of FIG. 5B, have the reliability of 50%, the number of blocks of the motion vector 305 of FIG. 3A that are included in the subject vectors is reduced by half as shown in FIG. 3B. As described above, the weighting of the subject vectors is performed using the distance maps.

In step S209 of FIG. 2, the CPU 103 extracts, using the image processing apparatus 107, a continuous region that has the same distance maps and subject vectors as those at the focal position. In the present embodiment, it is assumed that, if there are a plurality of regions to be extracted, the largest continuous region will be extracted, but it is also possible to determine a region to be extracted based on a composition such as that of the center of the screen.

The processing of step S209 will be described with reference to FIGS. 3A to 3D, and 6_a1 to 6_b4. The block regions 605 of FIG. 6_a5 are not adjacent to the block regions at the focal position, and thus are determined as having a motion vector of different subject. Accordingly, the motion vector 305 of FIG. 3B is excluded from the subject vector as shown by the reference numeral 308 of FIG. 3C.

As described above, the final subject vector region is identified, and motion vectors included in the subject vector region are averaged, thereby calculating a subject vector.

In step S210 of FIG. 2, the CPU 103 calculates, using the image processing apparatus 107, the subject speed based on the subject vectors. The moving amount (magnitude of the subject vector) v [mm] of the subject on the image capturing surface is converted into the angular velocity ωv [rad/sec] using Formula (3):

$$\omega v = fps \times \tan^{-1}(v/f) \quad (3)$$

where v [mm] is the moving amount (magnitude of the subject vector) of the subject on the image surface between frames, f [mm] is the focal length, and fps [frame/sec] is the frame rate. Then, the angular velocity ω [rad/sec] of the subject is calculated using Formula (4):

$$\omega s = (\omega + \omega v) \quad (4)$$

where ω [rad/sec] is the angular velocity of the image capturing device 100, and ωv [rad/sec] is the angular velocity conversion value of the subject vectors between frames.

The subject speed is calculated in the above-described manner.

In step S211, the CPU 103 determines whether or not exposure operation is to be performed. Note here that it is determined whether or not the shutter button included in the operating unit 111 has been pressed all the way down (hereinafter, whether or not a SW2 has been turned on). If the SW2 has not been turned on, the CPU 103 performs the operation from steps S201 to S210 in a repeated manner. If the SW2 has been turned on, the procedure advances to step S212.

In step S212, the CPU 103 operates, during exposure of the image capturing element 102, a shift lens of the optical system 101 based on a difference in value between the subject speed calculated in step S210 and the angular velocity of the image capturing device 100, and assists in capturing a panning shot.

Figure 8A:
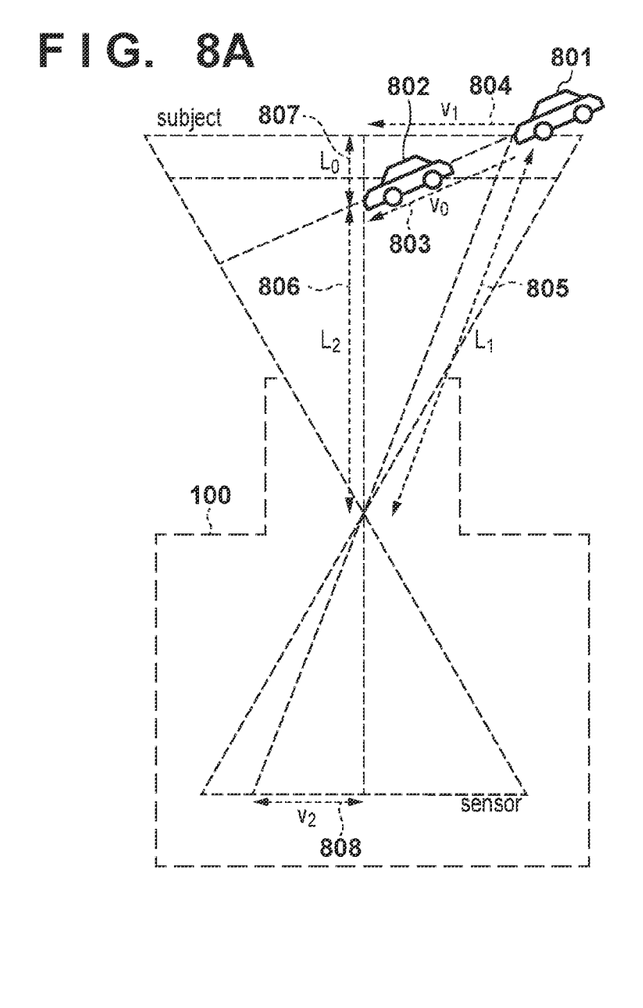
FIGS. 8A and 8B are diagrams illustrating a method for calculating a moving amount of a subject according to the first embodiment.

FIGS. 8A and 8B are diagrams illustrating an example of a case where a subject is moving not only right, and left but also forward and back, that is, the subject distance also changes. In FIG. 8A, assume that the position of the subject in the n-$^{th}$ frame is denoted by the reference numeral 801, and the position of the subject in the n+1-$^{th}$ frame is denoted by the reference numeral 802, the moving amount v0 that corresponds to the original subject speed is denoted by the reference numeral 803. However, if the mowing amount of the subject is detected assuming that a subject distance is fixed, a moving amount 804 (v1) that has the same moving amount as a moving amount 808 (v2) on the image surface will be detected as the moving amount of the subject.

Figure 8B:
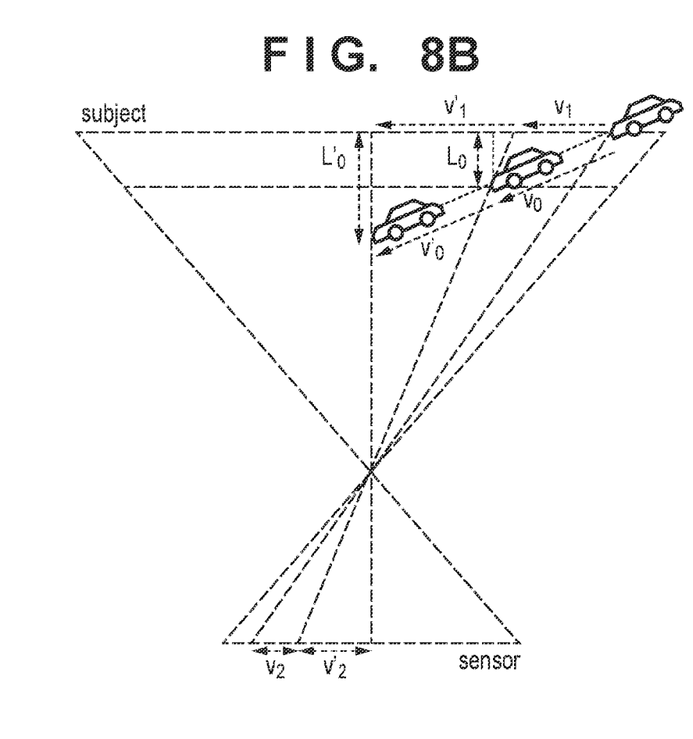

In FIG. 8B, assume that the moving amounts of the subject before the SW2 is turned on are v0, v1, and v2, and the moving amounts of the subject after the SW2 is turned on, that is, the moving amounts of the subject during exposure are v0', v1', and v2', the moving amounts on the image forming surface will change (v2≠v2'), even when the subject is moving at a constant velocity (v0=v0'). Accordingly, in order to detect the moving amount of the subject whose subject distance changes despite a fixed subject distance, it is necessary to predict the moving amount v1' of the subject after the SW2 is turned on, instead of the moving amount v1 of the subject before the SW2 is turned on. In the present embodiment, since the subject distances (L1, L2) can be detected using the distance maps, the moving amount v0, which corresponds to the original subject speed, is calculated using Formula (5):

$$v0 = \sqrt{(L0^2 + v1^2)}$$

$$L0 = \sqrt{(L1^2 - v1^2)} \quad (5)$$

Then, using the result of the above calculation and Formula (6), the moving amount v1' after the SW2 is turned on is calculated.

$$v1' = 2\sqrt{(v0^2 - L0^2)} - v1$$

$$v0' = v0$$

$$L0' = 2L0 \quad (6)$$

By operating the shift lens based on the subject speed that was calculated using the moving amount v1', it is possible to assist in capturing a panning shot even in the case where the subject is moving not only right and left but also forward and back. Accordingly, in assisting a user in capturing a panning shot, it is possible to detect a subject region and a subject speed more accurately.

Figure 9A:
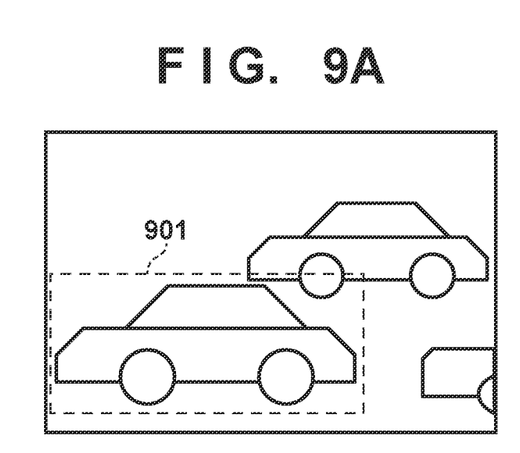
FIGS. 9A and 9B are diagrams illustrating effective scenes according to the first embodiment.
Figure 9B:
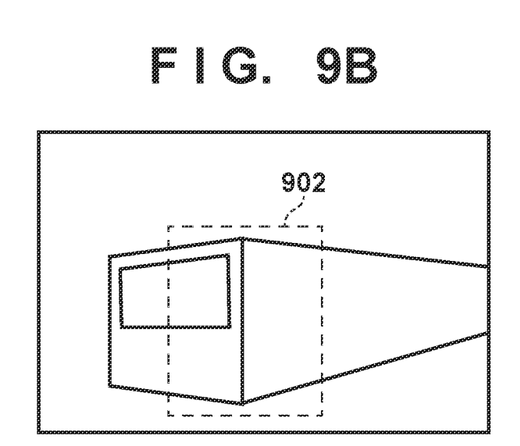

Note that in the present embodiment, an example in which one subject 901 is deduced from a plurality of subjects as shown in FIG. 9A was described. However, also in the case where the subject is approaching the user as shown in FIG. 9B, that is, the same subject has regions having different subject distances, processing the same as that the described above can be used to limit the region as shown in the reference numeral 902 for which the subject speed is calculated.

Furthermore, in the present embodiment, an example in which the position at which an image of the subject is formed is corrected by the shift lens was described, but the present invention is not limited to this, and for example, an aspect such as one in which the image capturing element 102 itself is shifted may be realized.

Second Embodiment

In a second embodiment, the configuration of the image capturing device is the same as that of the image capturing device 100 of the first embodiment that is shown in FIG. 1, and thus descriptions thereof are omitted here.

Figure 10:
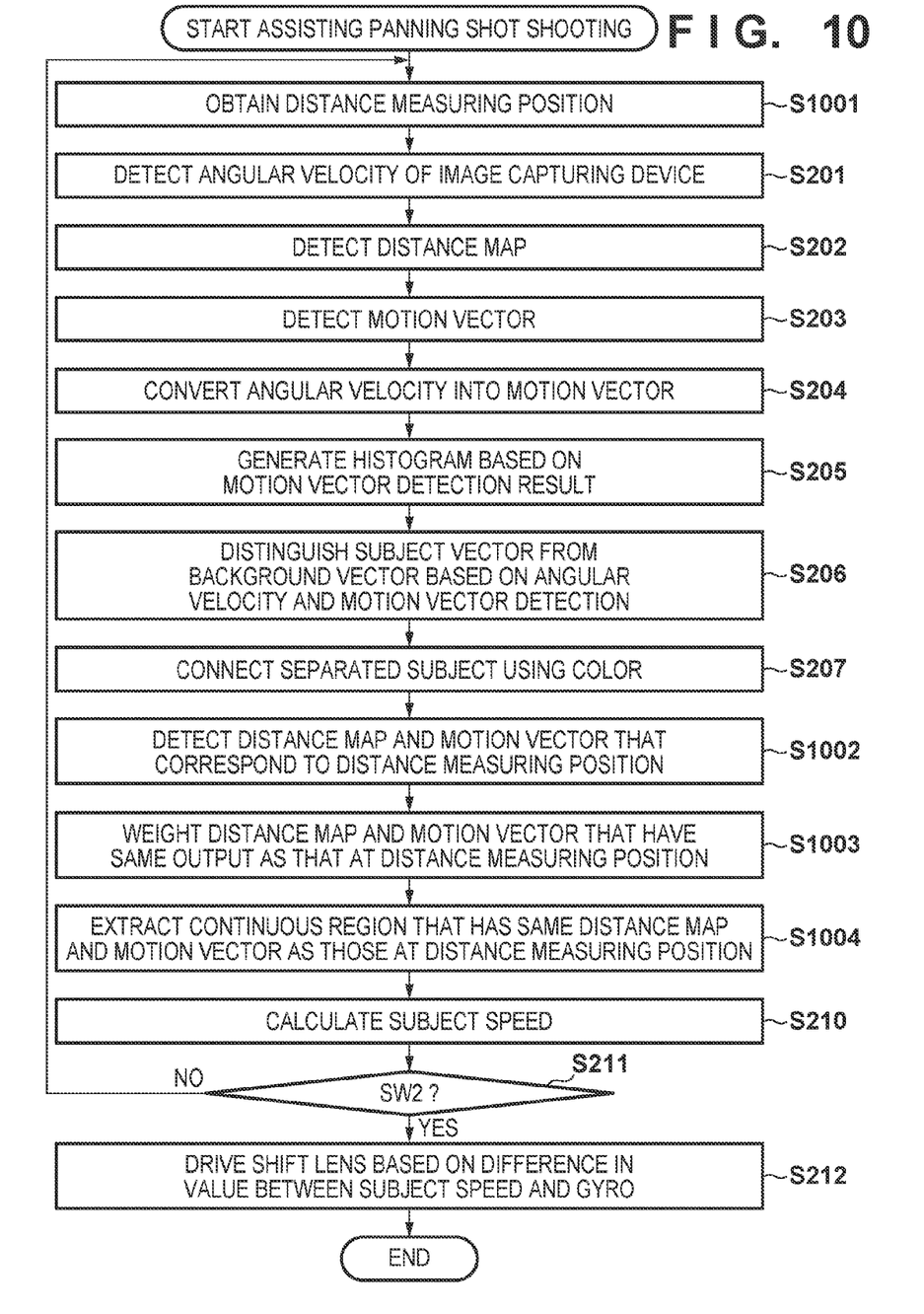
FIG. 10 is a flowchart illustrating processing for assisting in capturing a panning shot according to a second embodiment.

FIG. 10 is a flowchart illustrating the flow of operation for assisting in capturing a panning shot according to the second embodiment. Note that this flow can be started by, for example, a shutter button of an operating unit 111 being pressed halfway down, or the like. Furthermore, this operation for assisting in capturing a panning shot is performed in the state in which a plurality of frame images are continuously acquired by live view, a photometric sensor, or the like.

First, in step S1001, the CPU 103 obtains a distance measuring position that is set by a user using the operating unit 111. Note that steps S201 to S207 are the same as steps S201 to S207 of FIG. 2 of the first embodiment, and thus descriptions thereof are omitted here.

The following will describe a method for weighting a motion vector using the distance measuring position and the distance maps, and for calculating a subject vector, the method being a characteristic feature of the present embodiment.

In step S1002, the CPU 103 detects a block region that has the distance map and the motion vector that correspond to those at the distance measuring position (denoted by the reference numeral 1101 of FIG. 11) obtained in step S1001. In step S1003, the CPU 103 weights, using the distance map and the motion vector of the block region detected in step S1002, a distance map and a motion vector of another block.

Figure 11:
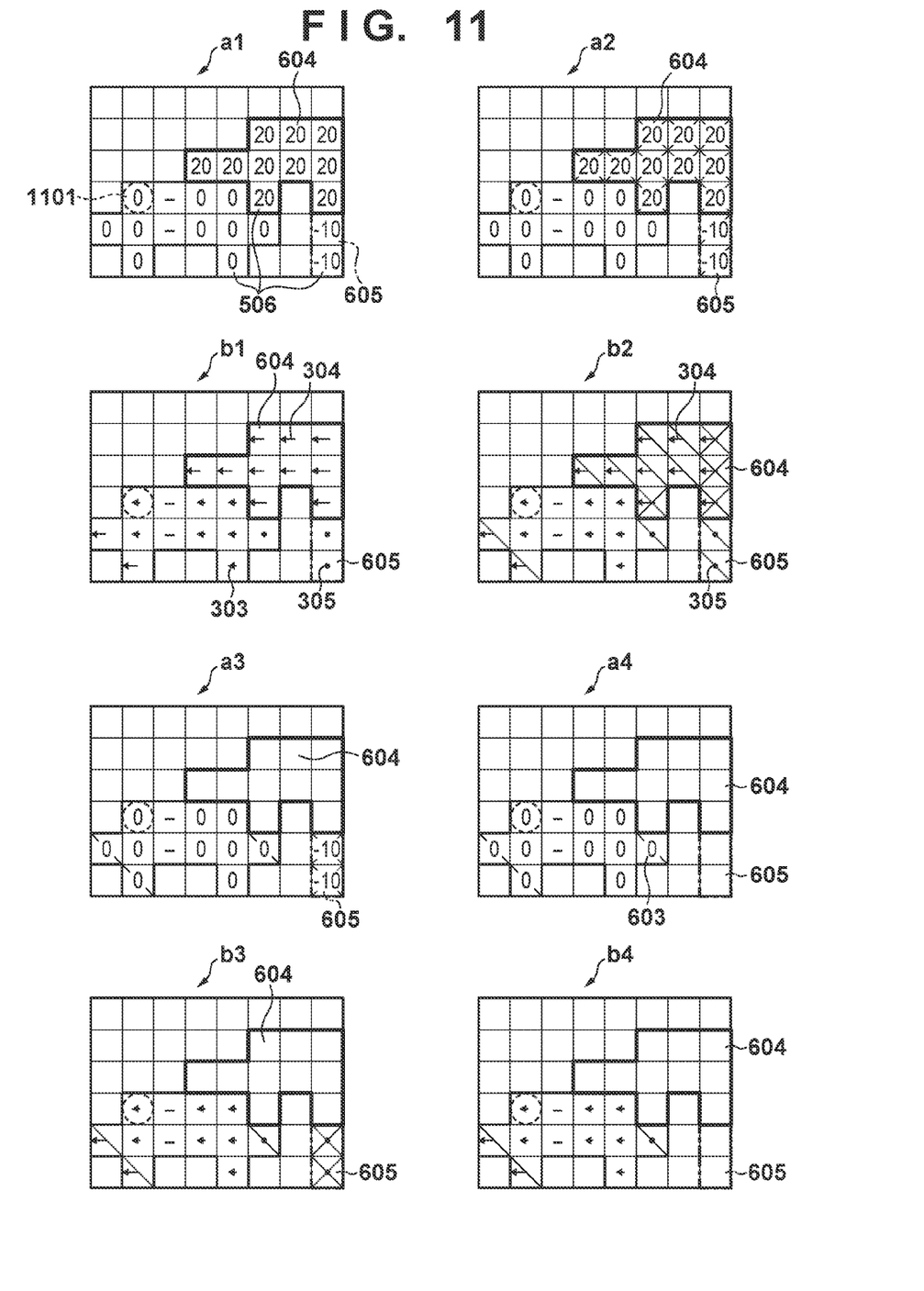
FIG. 11 is a diagram illustrating changes in distance maps and motion vectors according to the second embodiment.
Figure 12A:
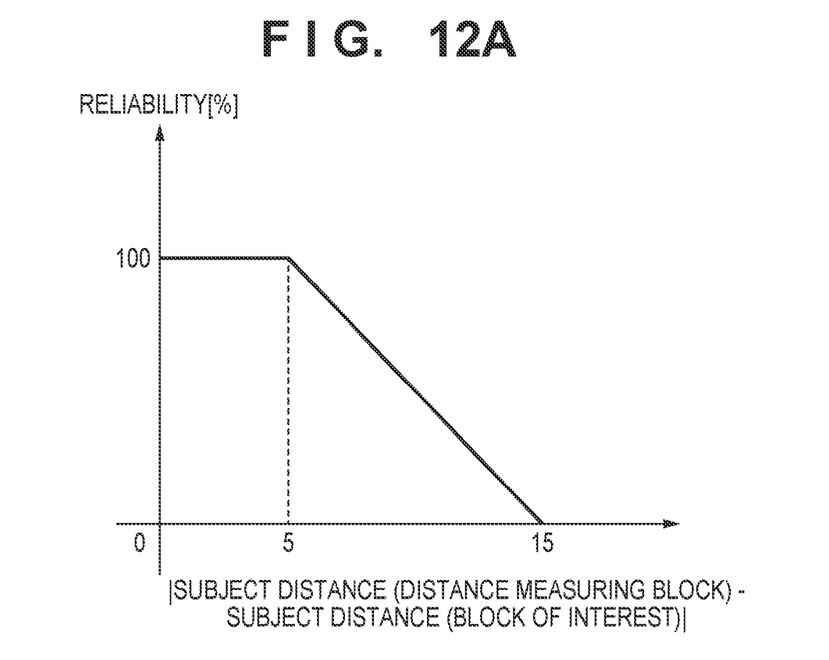
FIGS. 12A and 12B are diagrams illustrating reliability tables of the distance maps and the motion vectors according to the second embodiment.
Figure 12B:
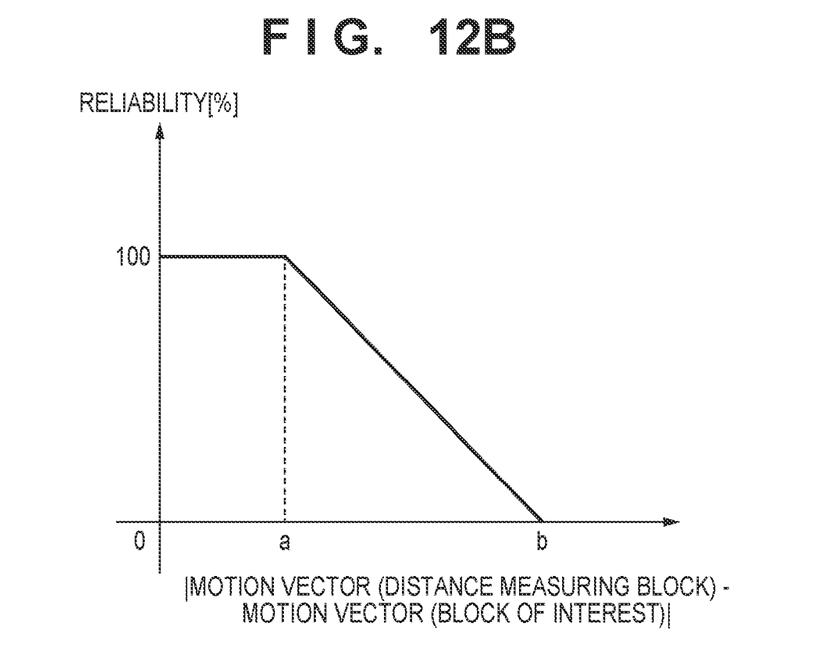

The details of the operations of steps S1002 and S1003 will be described with reference to FIGS. 3A to 3D, 5A and 5B, 11_*a*1 to 11_*b*4, and 12A and 12B. FIGS. 3A to 3D are diagrams illustrating changes in the histogram of motion vectors in a given frame. Note that in the present embodiment, only 3A and 3D are used for the description. Also, FIGS. 5A and 5B are diagrams illustrating subject vector regions in a given frame. Also, FIG. 11 is a diagram illustrating changes in the subject speed calculation regions in the frame shown in FIGS. 5A and 5B. In FIG. 11, a1 to a4 show difference values in the subject distance from the distance measuring position serving as a reference, and b1 to b4 show motion vectors. Lastly, FIGS. 12A and 12B show a reliability table for use in weighting a subject vector. FIG. 12A shows a reliability table using distance maps, and FIG. 12B shows a reliability table using the motion vectors.

Similar to the first embodiment, the reference numeral 306 of FIGS. 3A to 3D denotes subject vectors, and the reference numeral 506 of FIG. 5B (region 506 is obtained by combining regions 503, 504, and 505) denotes block regions determined as the subject vectors. Furthermore, the motion vector of the background 502 of FIGS. 5A and 5B, and the motion vectors of the subjects 503 to 505 are respectively denoted by the reference numerals 302, and 303 to 305 of FIGS. 3A to 3D. Furthermore, FIG. 11_*a*1 shows distance maps of the block region. 506 determined as the subject vectors, and FIG. 11_*b*1 shows motion vectors of the block region 506 determined as the subject vectors.

Assuming that the reference numeral 1101 of FIG. 11_*a*1 denotes the distance measuring position, the block regions 604 of FIG. 11_*a*1 have a difference value in the subject distance that is 20, and thus have a reliability of 0% according to the reliability table of distance maps of FIG. 12A. Furthermore, the block regions 605 have a difference value in the subject distance that is −10, and thus have a reliability of 50%. Here, the weighting result according to the reliability table of distance maps is shown in FIG. 11_*a*2. Note that "X" indicates a reliability of 0%, and "/" indicates a reliability of 50%.

Similarly, according to the reliability' table of motion vectors of FIG. 12B, the block regions 604 of FIG. 11_*b*1 have the reliability of 0%, and the block regions 605 have the reliability of 50% under the conditions of Formula (7). Here, the weighting result according to the reliability table of motion vectors is shown in FIG. 11*b*2. Note that "X" indicates the reliability of 0%, and "/" indicates the reliability of 50%.

Block region 604:

$$\text{Difference in magnitude of motion vector} \geq b$$

Block region 605:

$$\text{Difference in magnitude of motion vector} = (a+b)/2 \qquad (7)$$

Then, the weighting amount for the subject vector is determined by multiplying the reliability of distance maps and the reliability of motion vectors as given in Formula (8). Note that a3 and b3 in FIG. 11 show the weighting amounts for the subject vector, and "X" indicates a reliability of 25%, and "/" indicates a reliability of 50%.

$$\text{(Subject vector reliability)} = \text{(distance map reliability)} \times \text{(motion vector reliability)} \qquad (8)$$

Accordingly, weighting is performed so as to detect the block region that has a subject distance and a motion vector similar to those at the distance measuring position as the subject region. Note that the above-described, weighting method using distance maps and motion vectors is an example, and the present invention is not limited to this. The details of steps S1002 and S1003 have been described so far.

By extracting a region continuous to the distance measuring position by performing the processing of step S1004 of FIG. 10, the block regions 605 of FIG. 11 are excluded, and thus a3 and b3 in FIG. 11 take the form of a4 and b4 in FIG. 11. Note that step S1004 is basically the same as step S209 of FIG. 2 that was described in the first embodiment, except for the difference in which an focal position or a distance measuring position is used as the reference, and thus descriptions thereof are omitted here.

FIG. 3D shows the result obtained by performing the processing of steps S1003 to S1004 in the state of FIG. 3A. Because the motion vector 304 of FIG. 3A has a low reliability regarding the distance map, and the motion vector 305 corresponds to a region that are not continuous to the distance measuring position, the respective motion vectors are excluded from the subject vectors as shown by the reference numerals 309 and 310 of FIG. 3D. Furthermore, by performing weighting based on the reliability as shown by the reference numeral 603 of FIG. 11_*a*4, it is possible to reduce the proportion of influence on the subject vector as shown by the reference numeral 311 of FIGS. 3A to 3D.

In step S210, the CPU 103 calculates, using the image processing apparatus 107, the subject speed based on the subject vector that is weighted as described above. Note that the method for calculating the subject speed is the same as that of the first embodiment, and thus description thereof is omitted here. Steps S211 and S212 are the same as those of the first embodiment, and thus descriptions thereof are omitted here. By performing the above-described steps, assisting in capturing a panning shot can be achieved.

As described above, it is possible to detect a subject vector from a distance measuring position serving as a reference, and thus making it possible to more accurately detect the subject speed in a region of a subject that is desired by a user to appear to be still.

Note that the present embodiment has described an example in which the shift lens is used to correct a position at which an image of a subject is formed, but the present invention is not limited to this, and may be realized by an aspect in which, for example, the image capturing element 102 itself is shifted, or the like.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-049970, filed Mar. 12, 2015, which is hereby incorporated by reference herein in its entirety.

What is claimed is:

1. An image processing apparatus comprising:
   at least one processor or circuit configured to perform the operations, of the following units:
   a division unit configured to divide each of a plurality of frame images that were continuously captured by an image capturing unit into a plurality of regions on a screen;
   a motion vector detection unit configured to detect a motion vector for each of the divided regions of the plurality of frame images;
   a separation unit configured to separate a subject vector that indicates motion of a subject from a background vector that indicates motion of a background, based on a panning speed of the apparatus that was detected by a panning detection unit and the motion vector detected by the motion vector detection unit; and
   an identification unit configured to identify a subject region by weighting the subject vector based on information regarding a distance of the subject that was detected by a distance detection unit for each of the divided regions of the plurality of frame images.

2. The image processing apparatus according to claim 1, further comprising:
   a calculation unit configured to calculate a speed of the subject using the subject vector of the identified subject region.

3. The image processing apparatus according to claim 2, further comprising:
   an assistance unit configured to assist in capturing a panning shot by controlling motion of a blur correction unit configured to correct image blurring, based on the calculated speed of the subject.

4. The image processing apparatus according to claim 3, wherein the assistance unit controls motion of the blur correction unit based on a difference between the calculated speed of the subject and the panning speed.

5. The image processing apparatus according to claim 1, wherein the information regarding, a distance of the subject is a defocus amount.

6. The image processing apparatus according to claim 1, further comprising:
   an obtaining unit configured to obtain a distance measuring position,
   wherein the identification unit weights the subject vector based on the obtained distance measuring position.

7. The image processing apparatus according to claim 6, wherein the identification unit weights the subject vector, based on a difference in value between the information regarding a distance of the subject in the region of the plurality of regions that corresponds to the distance measuring position, and information regarding a distance of the subject in another region.

8. The image processing apparatus according to claim 6, wherein the identification unit weights the subject vector, based on a difference in value between the motion vector is the region of the plurality of regions that corresponds to the distance measuring position, and a motion vector in another region.

9. The image processing apparatus according to claim 6, wherein the identification unit identifies the subject region based on a continuous region in which the subject vector is continuous to that of the distance measuring position serving as a reference.

10. The image processing apparatus according to claim 1, further comprising:
    a color ratio detection unit configured to detect a color ratio for each of the divided regions,
    wherein the identification unit identifies the subject region by determining regions having a color ratio that is within a predetermined threshold as belonging to the same subject.

11. An image processing method comprising:
    dividing each of a plurality of frame images that were continuously captured by an image capturing unit into a plurality of regions on a screen;
    detecting a motion vector for each of the divided regions of the plurality of frame images;

separating a subject vector that indicates motion of a subject from a background vector that indicates motion of a background, based on a panning speed of an apparatus that was detected by a panning detection unit and the motion vector detected in the motion vector detection; and identifying a subject region by weighting the subject vector based on information regarding a distance of the subject that was detected by a distance detection unit for each of the divided regions of the plurality of frame images.

12. A non-transitory computer-readable storage medium having stored therein a program for causing a computer to execute the steps of an image processing method, the image processing method comprising:

dividing each of a plurality of frame images that were continuously captured by an image capturing unit into a plurality of regions on a screen;

detecting a motion vector for each of the divided regions of the plurality of frame images;

separating a subject vector that indicates motion of a subject from a background vector that indicates motion of a background, based on a panning speed of an apparatus that was detected by a panning detection unit and the motion vector detected in the motion vector detection; and identifying a subject region by weighting the subject vector based on information regarding a distance of the subject that was detected by a distance detection unit for each of the divided regions of the plurality of frame images.

* * * * *